United States Patent
Davis et al.

[19]

[11] Patent Number: 6,167,389
[45] Date of Patent: Dec. 26, 2000

[54] METHOD AND APPARATUS USING DISTRIBUTED INTELLIGENCE FOR APPLYING REAL TIME PRICING AND TIME OF USE RATES IN WIDE AREA NETWORK INCLUDING A HEADEND AND SUBSCRIBER

[75] Inventors: Glenn A. Davis, Lilburn; David M. Poche, Lawrenceville, both of Ga.

[73] Assignee: Comverge Technologies, Inc., Florham Park, N.J.

[21] Appl. No.: 08/984,786

[22] Filed: Dec. 4, 1997

Related U.S. Application Data

[60] Provisional application No. 60/033,832, Dec. 23, 1996.

[51] Int. Cl.$^7$ .................................................. G06F 17/60
[52] U.S. Cl. ............................ 705/412; 700/9; 700/11; 700/286
[58] Field of Search ................................ 324/103 R, 115, 324/116, 140 R, 142; 340/870.02, 870.03; 364/138, 140, 141, 143, 148, 400, 480, 481, 483, 492, 493; 700/9, 11, 12, 14, 28, 90, 286; 702/60, 61, 62; 705/412

[56] References Cited

U.S. PATENT DOCUMENTS

| | | | |
|---|---|---|---|
| 4,315,212 | 2/1982 | Gamoh | 324/142 |
| 4,547,847 | 10/1985 | Olig et al. | 364/148.07 |
| 4,706,081 | 11/1987 | Hart et al. | 340/825.03 |
| 5,673,252 | 9/1997 | Johnson et al. | 370/449 |
| 5,708,963 | 1/1998 | Mobley et al. | 455/12.1 |

FOREIGN PATENT DOCUMENTS

| | | |
|---|---|---|
| 0429056 | 5/1991 | European Pat. Off. . |
| 1951655 | 11/1996 | Germany . |
| 2-184198 | 7/1990 | Japan ............................... 379/102.01 |
| 2-184199 | 7/1990 | Japan ............................... 379/102.03 |
| 98/30912 | 7/1998 | WIPO . |

OTHER PUBLICATIONS

"Fujitsu Adwall: Fujitsu and AdWall team up to provide first digital poster network": Jun. 30, 1997; Business Editors.

*Primary Examiner*—Edward R. Cosimano
*Attorney, Agent, or Firm*—Renner, Otto, Boisselle & Sklar, LLP

[57] ABSTRACT

A control system is disclosed which varies the operation of consumer's devices to minimize influx currents across a power grid. Power consuming devices are scheduled to operate in accordance with varying pricing tiers. As customers schedule the operation of various devices and appliances in accordance with pricing tiers, when the tiers change, the current drain on the power grid increases significantly. Even increasing the strain on the power grid is the fact that the startup current for electric motors is up to six times their normal operating current. When started, as electric motors place a heavy strain on a power grid, the power strain lead to the disruption of power to the very consumers requiring more power. The present invention randomizes the start up times of the controlled devices so as to minimize the strain of the power grid as each one comes on line.

17 Claims, 6 Drawing Sheets

| BYTE | CONTENTS |
| --- | --- |
| 1 | talkAddrFactory |
| 2 | " |
| 3 | " |
| 4 | " |
| 5 | talkAddr |
| 6 | " |
| 7 | ackAdr |
| 8 | " |
| 9 | listenAddr |
| 10 | " |
| 11 | frameNum |
| 12 | holdOff |
| 13 | Gateway Control: b7= sysDegraded; b3-0= aloha range |
| 14 | na |
| 15 | na |
| 16 | na |
| 17 | na |
| 18 | na |
| 19 | msgType |
| 20 | seqNum |
| 21 | ackNum |
| 22 | PID (protocol interface ID - specific interface type expected in gateway) |
| 23 | GPPD (Gateway peripheral processor data) |
| 24 | len |
| 25 | PTID (protocol translator ID or return address) |
| 26 | " |
| 27 | " |
| 28 | " |
| 29 | sessionId |
| 30 | sessionId |
| 31 | Native data packet (64 bytes) |
| 32 | " |
| ⋮ | ⋮ |
| 93 | " |
| 94 | " |
| 95 | CRC1 |
| 96 | CRC2 (last byte of message) |

FIG - 3

| BYTE | CONTENTS |
|---|---|
| 1 | talkAddrFactory |
| 2 | " |
| 3 | " |
| 4 | " |
| 5 | talkAddr |
| 6 | " |
| 7 | frameNum |
| 8 | gateway Data1: b7= reqToSend; b3-b0= buffer available |
| 9 | na |
| 10 | na |
| 11 | msgType |
| 12 | seqNum |
| 13 | ackNum |
| 14 | PID (peripheral processor ID) |
| 15 | GPPD (Gateway peripheral processor data) |
| 16 | len (length of valid bytes in native data packet) |
| 17 | PTID (protocol translator ID or return address) |
| 18 | " |
| 19 | " |
| 20 | " |
| 21 | sessionId |
| 22 | sessionId |
| 23 | Native data packet (64 bytes) |
| 24 | " |
| 25 | " |
| ⋮ | ⋮ |
| 85 | " |
| 86 | " |
| 87 | CRC1 |
| 88 | CRC2 (last byte of message) |

FIG - 4

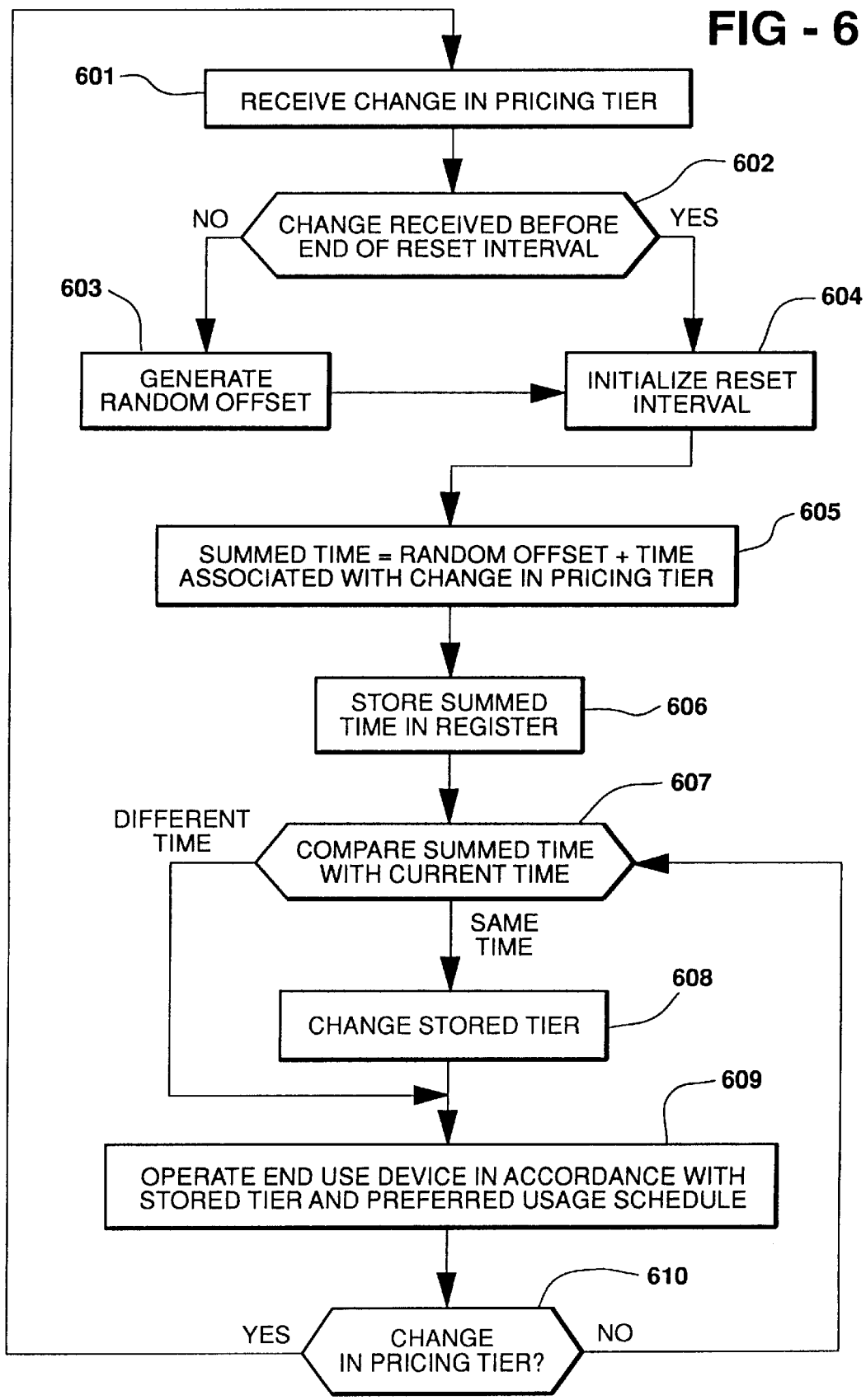

METHOD AND APPARATUS USING DISTRIBUTED INTELLIGENCE FOR APPLYING REAL TIME PRICING AND TIME OF USE RATES IN WIDE AREA NETWORK INCLUDING A HEADEND AND SUBSCRIBER

RELATED APPLICATIONS

This application claims the benefit of U.S. Provisional Application No. 60/033,832, Dec. 23, 1996.

The present invention is related to the following disclosures: U.S. Ser. No. 08/604,784, entitled "Method and Apparatus for Command and Control of Remote Systems Using Low Earth Orbit Communication Systems", filed Feb. 23, 1996; U.S. Ser. No. 08/390,461, entitled "Method and Apparatus for Using Satellites for Reverse Path Communication for Direct To Home Satellite Communication", filed Feb. 24, 1995, now U.S. Pat. No. 5,708,963 granted Jan. 13, 1998; and, U.S. Ser. No. 08/751,946 entitled "Method and Apparatus for Communicating Information Between a Headend and Subscriber Over a Wide Area Network", filed Nov. 19, 1996, now U.S. Pat. No. 5,896,382, granted Apr. 20, 1999. All of these disclosures are incorporated herein by reference for any necessary disclosure.

FIELD OF INVENTION

The invention generally relates to a control system for controlling when power consuming devices are started. More particularly, the present invention is directed to a scheme for communicating information such as utility scheduling tiers from a headend over a wide area network (WAN) to a gateway coupled to subscribers, and, in response, varying the start time for the power consuming devices.

BACKGROUND OF INVENTION

Utilities often have to cope with the problem of satisfying consumer demand for energy. Energy demands fluctuate widely between peak and off-peak periods. For example, energy demands peak during hot summer days when consumers require air conditioning. One of the ways utilities handle such situations is by employing load management systems. Information is communicated between subscribers and a headend to efficiently manage consumer energy demands.

Other energy services have been developed including utility-based applications such as water, gas, and electric meter readings. In these applications, the headend communicates with- a meter at a subscriber's premises. Often subscribers want to know what their energy cost and usage are at a particular time, for example during a billing period. An existing utility application allows the subscriber to request this information from the utility. The utility first obtains the information from the meter at the subscriber's premises, performs a calculation at the headend and transfers the desired information to the subscriber.

More and more applications have developed including those which extend beyond conventional utility applications. For example, home security and monitoring and the ability to program appliances are applications which can be implemented. These applications are distributed by different companies which use different protocols for both implementation of their services and for compatibility with the devices located on the subscriber premises.

Existing systems for communicating utility applications are closed or proprietary systems which require a specific type of native message compatible with devices located on the subscriber premises. For example, the applications are distributed over a wide area network that is specifically designed to handle the protocol for a particular vendor's application and the device located at the subscriber's premises.

Some signals received over the wide area networks referenced above are used to control the operation of various appliances. In most cases, these appliances consume electrical energy or fossil fuels. In the case of appliances run by electrical motors, utility companies vary the pricing of each unit of power throughout the day, week, month, or year to compensate for the load placed on their power distribution network. These pricing levels are known as price tiers. One outcome of power companies varying the price of electrical energy over time is a reduction in consumption during the high cost time intervals and a greater consumption during the lower cost time intervals. While the initiation of operation of an individual user's electrical appliances immediately after a change in a price tier do not appear to affect the individual user, the operation of many consumers in this manner can create a tremendous load on the power distribution network. For example, some electric motors require six times their normal operating currents during start up. When a number of users turn on, for example, their HVAC (heating, ventilation, and air conditioning) systems, the influx of current may be up to six times the normal load on the power grid. This initial influx can compromise the integrity of the power grid and, at when the power grid is fully loaded, result in a reduction or shut off in the power supplied to homes. These reductions and shut-offs of power are commonly known as brown-outs or black-outs. These events happen due to the reactions of reclosures.

Reclosures are circuit breakers located on utility poles. They guard against excessive current draws on power lines by tripping and resetting three times then by tripping without reset. For example, when a power line breaks (e.g., due to a falling tree), there is generally a current discharge from the power line to ground. The reclosure detects this abnormally high current and opens the current path. After a short interval, the reclosure resets and is tripped by the excessively high current flow. Finally, the reclosure reaches its preset number of retries and stays open. By this operation, the current flowing through the power line is stopped, protecting passersby and property from being caught in the path of the discharge of current. As the downed power line is only one element of a power grid interconnecting a variety of current paths, the power, which would have flowed through the downed power line, is rerouted through other utility lines. While the power is rerouted to compensate for the downed line, some homes near the downed power line may temporarily suffer a brownout or blackout until power is restored. This same brownout or blackout effect may also occur during the change in pricing tiers as mentioned above as reclosures may be repeatedly tripped by high current flows evident following price tier changes.

Accordingly, a need exists to minimize the stress of initial operation current fluxes on power grids.

SUMMARY OF THE INVENTION

The present invention overcomes the aforementioned problems by altering the operation of controlled end use devices by controlling the initial start times of devices at subscriber locations. The end use devices at each subscriber location receive an indication of a pricing tier change. In response, each end use device generates a random startup time offset and applies it to a time associated with the received pricing tier change. In an alternate embodiment, the gateway generates the random offset for the consumer's devices. Next, the modified times are compared to determine whether a preferred schedule indicates that the operation of controlled devices should change. If a change is needed, then the devices are controlled in accordance with the preferred schedule and pricing tier in effect. Accordingly, massive influx currents due to controlled device startups at consumers' locations can be significantly reduced.

BRIEF DESCRIPTION OF THE DRAWINGS

The present invention will now be described in more detail with reference to preferred embodiments of the invention, given only by way of example, and illustrated in the accompanying drawings in which:

FIG. 3 shows an illustrative downstream data packet according to the present invention.

FIG. 4 shows an illustrative upstream data packet according to the present invention.

FIG. 6 shows a flowchart as contemplated by embodiments of the present invention.

DETAILED DESCRIPTION

The present invention is discussed below with reference to a broadband communications network. However, the present invention may be extended to other types of communications networks and systems. Also, the present invention will primarily be described with reference to residential applications for purposes of illustration, although it should be understood that its applicability is widespread including commercial and industrial applications.

The present invention relates to a system architecture for providing a platform for communicating energy services (utility applications) and non-traditional services as part of an overall communications infrastructure. According to the invention, a native message, regardless of the source of the message's application, is divided into data packets that are encapsulated. The encapsulated data packets are transmitted through an open network from a headend to a gateway or from the gateway to the headend. The receiver of the encapsulated data reassembles the original native message from the encapsulated data packets.

Figure 1:
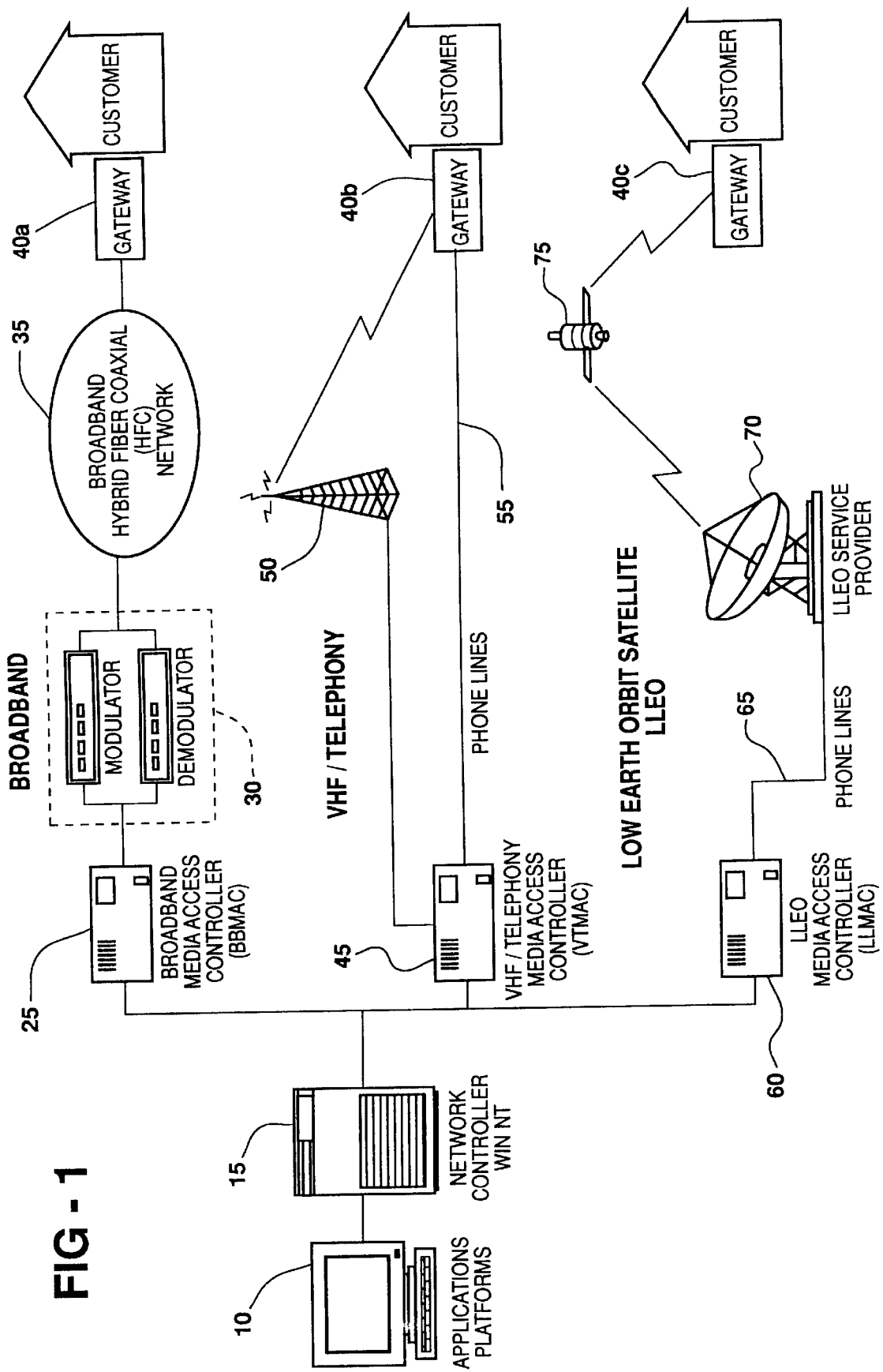
FIG. 1 illustrates several representative wide area networks for transporting information between a headend and subscribers according to the present invention.

An illustrative embodiment of the system is shown in FIG. 1. Applications platforms 10 provide utility applications to network controller 15 in the form of a native message payload and protocol. An applications platform includes its application and a protocol translator for utilization of the application. The native message payload generated by an applications platform is data for communication between one of the applications platforms 10 and the destination device, for example an in-home device such as a meter or appliance. Other data generated by the applications platforms 10 include a peripheral id (PID) which uniquely identifies the protocol and medium (local area network) for the in-home device, gateway peripheral processor data (GPPD) for communications with the medium for the in-home device, payload message length (len) which identifies the number of bytes in the native message payload, protocol translator id (PTID) which identifies the address of the originating applications platform at the headend, and a communications session identifier (SessionsID) for correlating an upstream response with a particular downstream request.

The system includes multiple applications platforms based on the number of applications. Typical applications include, but are not limited to, automatic meter reading for gas, water, and electric, load management, real time pricing for gas, water, and electric, outage detection, tamper detection (e.g., tampering with meters), remote service connect or disconnect, home security, customer messaging, and home automation. Utility application providers include, among others, Honeywell, General Electric, Schlumberger, American Innovations, and WE X. L.

The network controller 15 receives the native message payload and protocol from one of the applications platforms 10 in a data packet. Communications with the network controller 15 may be by TCP/IP (transaction communication protocol/Internet protocol) on Ethernet or other typical local area network forms. The hardware interface can vary as necessary. A routing look-up table assigns an address to each data packet. The network controller 15 forwards each data packet to an appropriate media access controller (MAC) based on the WAN form used to communicate with the gateway coupled to the subscribers. Thus, prior to sending the data packet to the MAC, the network controller 15 places the native message and protocol in a data packet with the MAC address.

The network controller 15 is a resident database that contains the control algorithms to route and store data for the applications. The network controller 15 configures the downstream flow of data in the system. In functioning as a database, the network controller 15 contains subscriber records and data in its files and provides other applications with data on request. In an exemplary embodiment of the present invention, the network controller 15 can accommodate 65,000 sites in broadband.

The system supports multiple WAN forms including, but not limited to, coaxial, fiber and hybrid fiber coaxial (HFC) broadband, RF, telephony, and satellite (e.g., low-earth orbit (LEO), little LEO (LLEO)). Exemplary WANs are shown in FIG. 1. Express reference is made to U.S. patent application Ser. No. 08/751,946, entitled "Method and Apparatus for Communicating Information Between a Headend and a Subscriber Over a Wide Area Network", filed Nov. 19, 1996, now U.S. Pat. No. 5,896,382, granted Apr. 20, 1999, whose disclosure is expressly incorporated herein by reference for any necessary disclosure.

When the data packet is to be sent by broadband, the broadband media access controller (BBMAC) 25 receives the data packet and removes the MAC address and encapsulates the data packet with header information and CRC error detection bits. The BBMAC 25 places the data packet into a network TDMA scheme using time slots for communication. The WAN architecture may be designed to support asynchronous transfer mode (ATM) transport with UDP/IP (user datagram protocol/Internet type, addressing on the cable system. TDMA addressing is preferred. The TDMA transport is used primarily, on a dynamically allocated basis, for routing message traffic and for file transport facilities. The BBMAC 25 operates in real time using an intelligent device such as a personal computer to transmit and receive real time data to and from a baseband modulator and demodulator in a modem 30. In an exemplary implementation, BBMAC 25 is a Windows NT Pentium running at 166 MHz with 120 M RAM.

The BBMAC 25 passes the slotted data packet in standard NRZ (UART) form at a rate of 115.5 kbps to digital modem 30. The modem 30 includes a broadband modulator and demodulator that physically interface the headend to the HFC network 35. The modem generates data communications (e.g., FSK, QPSK) based on signals provided at baseband in real time. The modulator portion of modem 30 receives the slotted data packet over a hardwired link such as an RS-422 connector. The data packet transmission rate is converted to 125 kbps by a microprocessor such as an 80C51XA by Philips Electronics. The 125 kbps data packet undergoes modulation (e.g., FSK) and is transmitted over the broadband HFC network 35 to gateway 40*a*.

The HFC network 35 is utility non-application specific, meaning no special modifications are required to provide utility applications. This is a feature common to all the WANs utilized. The typical architecture of an EFC network 35 includes a number of fiber nodes that receive and convert optical signals to electrical signals, and drive two-way signals onto the coaxial plant. In an illustrative embodiment, a fiber node can serve between 500 and 2000 homes. From the node, a coaxial distribution network carries signals to subscribers' homes. Along the distribution network, the side-of-the-home gateways 40*a* are connected for the final link to the utility application in-home devices such as an electric meter and home user interface. According to this exemplary embodiment, data may be transported at 125 kbps using FSK modulation. This approach permits apparent asynchronous communication, file transfer activities, Internet access and other modem functions, and shareable channel with other services in TDMA. In another broadband embodiment, data may be transported at T1 speed with a 1 MHz bandwidth in the forward and reverse directions (1.5 Mbps). QPSK modulation may be used for robust data communications and high bandwidth efficiency.

Other WANs can be used and their operation is described herein generally. When the data packet is sent by radio frequency (RF) such as at very high frequency (VHF) or via telephony, a VHF/telephony media access controller (VTMAC) 45 receives and transmits the data packet. Thereafter, if the data packet contains an unscheduled message, it is distributed by RF and sent to a radio tower 50 which broadcasts the information over the RF network to gateway 40*b*. Otherwise, the data packet is put onto the telephone network phone lines 55 and sent to gateway 40*b*. According to this exemplary configuration, the VTMAC 45 can control data transport so that unscheduled messages can be transported via the RF network while scheduled transactions and gateway return communications can be transported via the telephone network.

If the data packet is to be distributed via satellite, a little LEO (LLEO) media access controller (LLMAC) 60 receives and communicates the data packet over the phone lines 65 to a LLEO service provider 70 that broadcasts the information over a satellite network 75 to a gateway 40*c*. The return path for satellite-related communications is described in greater detail in U.S. Ser. No. 08/604,784, entitled "Method and Apparatus for Command and Control of Remote Systems Using Low Earth Orbit Communication System", filed May 10, 1996 and U.S. Ser. No. 08/390,461, entitled "Method and Apparatus for Using Satellites for Reverse Path Communication for Direct To Home Satellite Communication", filed Feb. 24, 1995, now U.S. Pat. No. 5,708,963, granted Jan. 13, 1998, whose disclosures are expressly incorporated herein by reference for any necessary disclosure.

The changes in pricing tiers are transmitted from the headends across the WANs to the gateways. In the broadband communication path 35, a signal indicating the change in pricing tier is transmitted concurrently with, or shortly before, the actual time of the change in pricing tier to gateway 40*a*. In comparison, in the narrowband communication paths (via radio tower 50, phone lines 55, or satellite 75), a signal indicating the schedule of changes in pricing tiers is transmitted to gateways 40*b* or 40*c*. Embodiments of the present invention contemplate the transmission of tier schedule information over broadband 35 and the transmission of a signal indicating the change in pricing tier (like that transmitted over WAN 35) via the narrowband communication paths (radio tower 50, phone lines 55, or satellite 75).

The power usage by each customer connected to gateways 40*a*, 40*b*, and 40*c* is transmitted back to the network controller (or a similar data collecting device) to collect power usage information for billing purposes. Each gateway 40*a*, 40*b*, and 40*c* is connected to the power meter of each customer. Accordingly, as each customer uses power, the meter readings are collected and transmitted upstream over various return paths. In the broadband approach of WAN 35, the meter reading is transmitted on a regular basis either automatically or upon polling from gateway 40*a* to the headend. In the narrowband approaches, the meter reading is stored in gateway 40*b* and 40*c* for a greater period of time and transmitted at a greater interval (for example, once every two weeks).

Figure 2:
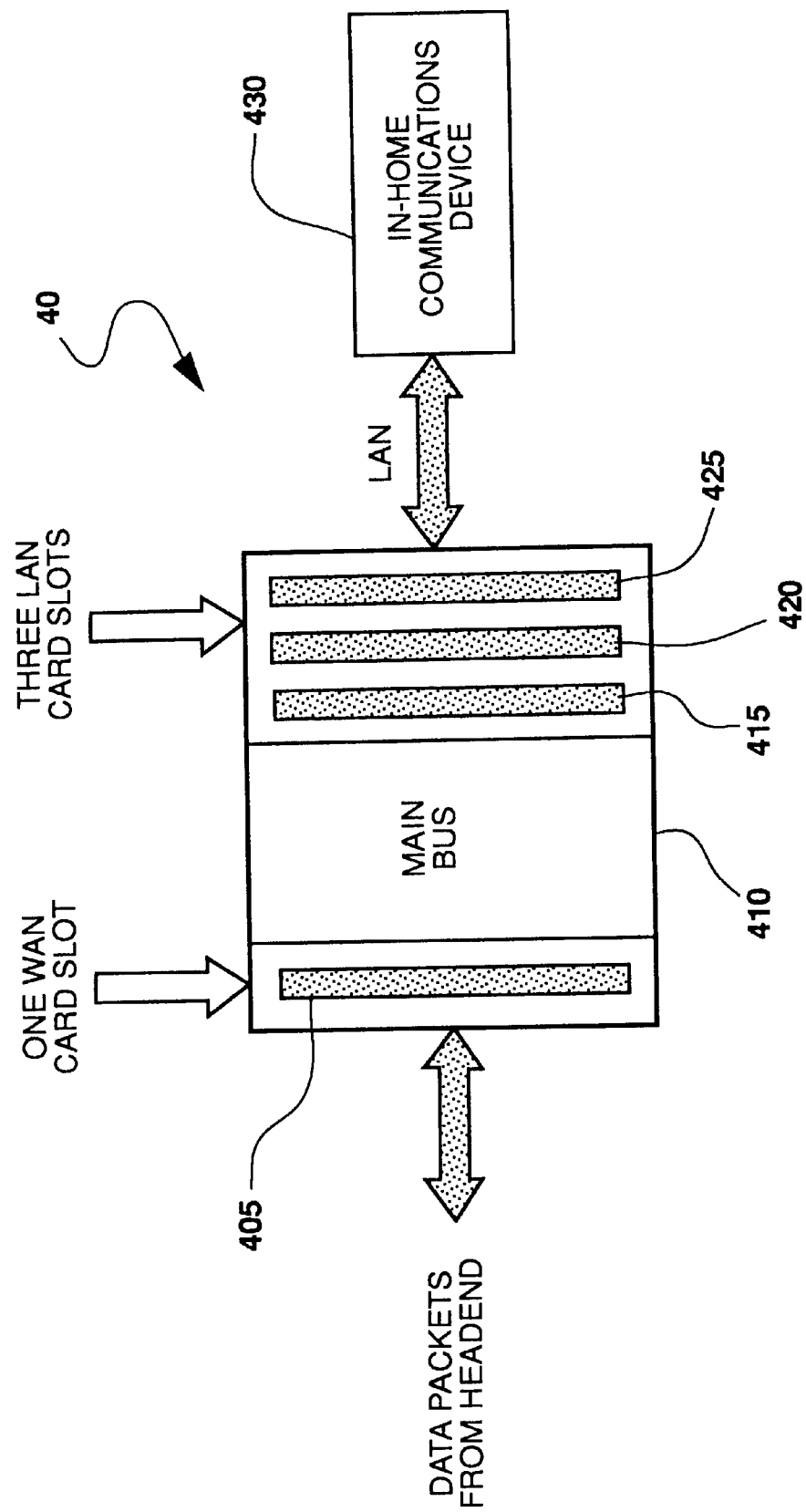
FIG. 2 is an exemplary embodiment of a gateway according to the present invention.

An illustrative gateway 40 is depicted in FIG. 2. The gateway 40 provides data communications from the WAN to a home LAN, and is designed to facilitate communication between the utility host (applications platforms) and residential devices such as an electric meter or home user interface. The gateway 40 can be designed to handle communications for a single homesite or multiple homesites and support installations at the homesite as well as pole top and other locations.

Encapsulated data packets are received over the WAN from the headend. The gateway 40 has one WAN interface 405 corresponding to the WAN (e.g., broadband, LLEO, RF, etc.) from which it communicates with the headend. The WAN interfaces are plug-in modules removable from the gateway. Thus, another complete physical and logical WAN interface can be implemented without the need to change any other parameters or devices in the gateway 40. Thus, if data transport is to take place over a different WAN network, the WAN interface 405 can imply be replaced.

In an exemplary broadband implementation of the gateway 40, the WAN interface 405 may include an FSK transceiver if the modulation technique at the headend is FSK. Also, the WAN interface 405 provides control for the TDMA transport scheme using a microprocessor. The microprocessor can receive messages, check CRC and address information, perform TDMA decoding, clocking, buss interface and memory management. The microprocessor will also manage the TDMA transmitter in response to the embedded clock signals in the downstream data packets. The microprocessor may be an 80C51XA made by Philips Electronics or in the Motorola 68000 family with internal ROM, RAM and EEROM.

According to another exemplary broadband implementation of the gateway 40, the WAN interface 405 may include a QPSK transceiver if the headend uses QPSK modulation. Some of the functions which may be embedded in this illustrative WAN interface include ATM filtering, IP filtering, TDMA control, CRC calculator, 68000 type or 80C51XA microcontroller, and buss controller and LAN interface drivers. External ROM may be used to support program control of the WAN communications interface. An external RAM can provide temporary storage of data. An external EEROM may be provided for permanent storage for MAC address and other permanent or semi-permanent data. The microcontroller manages slotted Aloha transmission and the TDMA transport scheme.

The WAN interface 405 demodulates the data packet and removes the header including routing and control information from the packet put on by the MAC. The WAN interface 405 sends the data over common bus 410 to an appropriate LAN interface 415, 420, 425 which translates and removes the protocol and recovers the native message when the gateway 40 is instructed to listen and pass the native message to the in-home device 430. The protocol removed includes PTID, PID, GPPD, and SessionID.

In the illustrative embodiment of FIG. 2, three LAN interfaces 415, 420 and 425 are provided. It is to be understood that any number of LAN interfaces may be provided. However, it is prudent to choose a relatively small number such as five because the size of the gateway increases as the number of LAN interfaces increases. Also, when a new application is implemented by a subscriber, the LAN interface corresponding to the new application simply needs to be added. The LAN interfaces can be plug-in cards, wherein replacement and addition of LAN interfaces is relatively easy. Exemplary LAN interfaces may include a LonWorksJ interface, CEBusJ interface, hardwired interface, RF interface, an RS-232 interface, and a broadband modem. LonWorksJ and CEBusJ are specific protocol designed for power line carrier communications.

The LonWorksJ interface is designed to provided Echelon power line carrier communications for the home LAN. The interface includes a microprocessor which is responsible for buss interface and protocol translations. The microprocessor may be a Neuron chip by Motorola. The Neuron chip receives standard LonWorksJ protocol to be inserted on the power lines. The data is routed to an Echelon PLT 20 communications device and inserted on the power wiring through a coupling network and external wiring. The Neuron chip handles data transport issues including collisions and delivers the requested data to the microprocessor when available. The microprocessor then presents data to the WAN interface 405 via the common bus 410 for communications to the MAC or other application as directed by routing (mapping) tables in the WAN interface 405. In some instances, gateway 40 may have intelligence such as in a narrowband implementation or in broadband if intelligent gateway and be able to directly rout information elsewhere, for example to a nearby load control device.

The CEBusJ interface provides CEBusJ power line carrier communications for the home LAN. The microprocessor may be in the 68000 family or a Philips 60C51XA and interface with a CEBusJ communications device which inserts the data on the power wiring through a coupling network and external wiring. The microprocessor handles data transport issues including collisions and delivers the requested data to the WAN interface 405 via the common bus 410 for communications to the MAC or other application as directed by routing (mapping) tables in the WAN interface 405.

The hardwired interface is provided for applications such as low cost scenarios. This interface provides for a pulse initiator and maintains an accumulator function with an EEROM type memory and long term battery support. The interface takes input from devices such as electric, gas, and water meters.

The RF interface provides wireless communications for devices in and around the home such as electric, gas, and water meters, and appliances.

An RS-232 interface can support services such as local narrowband nodes. The RS-232 interface may extract data files from a local host system on command. This permits the transfer of large data files.

A broadband modem may share the utility data communications channel for the purpose of Internet access and other computer type services. Rapid access to file servers providing access to a variety of services can be realized.

A native message is transmitted upstream from the in-home device 430 to the applications platforms 10 over the same mediums. The in-home device 430 passes the native message to its corresponding LAN interface (one of 415, 420, 425). The LAN interface adds the protocol to the native message and passes the data packet with the protocol and native message to the WAN interface 405 via the bus 410. The WAN interface 405 encapsulates the data packet by adding a header and transmits the information upstream from the gateway 40 over the appropriate WAN to the headend. For example, the gateway 40 can transmit the information over the HFC network 35 to the headend at a rate to 125 kbps. At the headend, the demodulator portion of broadband modem 30 demodulates the upstream data packet from a 125 kbps FSK modulated NRZ signal to a 115.2 kbps baseband NRZ signal.

The encapsulated data packet is then sent to the BBMAC 25 over an RS-422 data link. BBMAC 25 removes the header information leaving the protocol and native message. BBMAC 25 acknowledges receipt of upstream asynchronous messages prior to hand off to other applications to preserve data integrity. In the TDMA mode, BBMAC 25 checks for transport cell integrity by performing cyclic redundancy checking on the data and forwarding the data to the appropriate one of the applications platforms 10. To further enhance data integrity, BBMAC 25 sets up sessions between the applications platforms 10 and gateway 40. BBMAC 25 behaves as a bridging data router between the applications platforms 10 and the in-home devices coupled to the gateway 40. Communications to applications platforms 10 can be tightly linked to minimize real time delay for message transport while not slowing polled and asynchronous data transport. Returned power levels can be evaluated on every returned message and can be adjusted when outside predetermined boundaries.

The data packet passes through the network controller 15 and to the appropriate applications platform 10 where the protocol is removed and the native message from the in-home device 430 is recovered.

An illustrative TDMA transport scheme according to the present invention for use in a broadband network is controlled by BBMAC 25. The header information encapsulating the native message and protocol provides for the scheme. FIG. 3 shows the contents of an exemplary downstream data packet. Bytes 1–21 represent the header information added by BBMAC 25 to the protocol (bytes 22–30) and the native message (bytes 31–94) with bytes 95 and 96 providing the CRC error detection. FIG. 4 shows the contents of an illustrative upstream data packet. Bytes 1–13 represent the header information added by the LAN interface to the protocol (bytes 14–22) and the native message (bytes 23–86) with bytes 87 and 88 providing CRC error detection.

The TDMA scheme as illustrated in FIGS. 3 and 4 is described in greater detail in related U.S. Ser. No. 08/751,946, entitled "Method and Apparatus for Communicating Information Between a Headend and Subscriber Over a Wide Area Network", filed Nov. 19, 1996, now U.S. Pat. No. 5,896,382, granted Apr. 20, 1999, incorporated herein by reference for any necessary disclosure.

Figure 5:
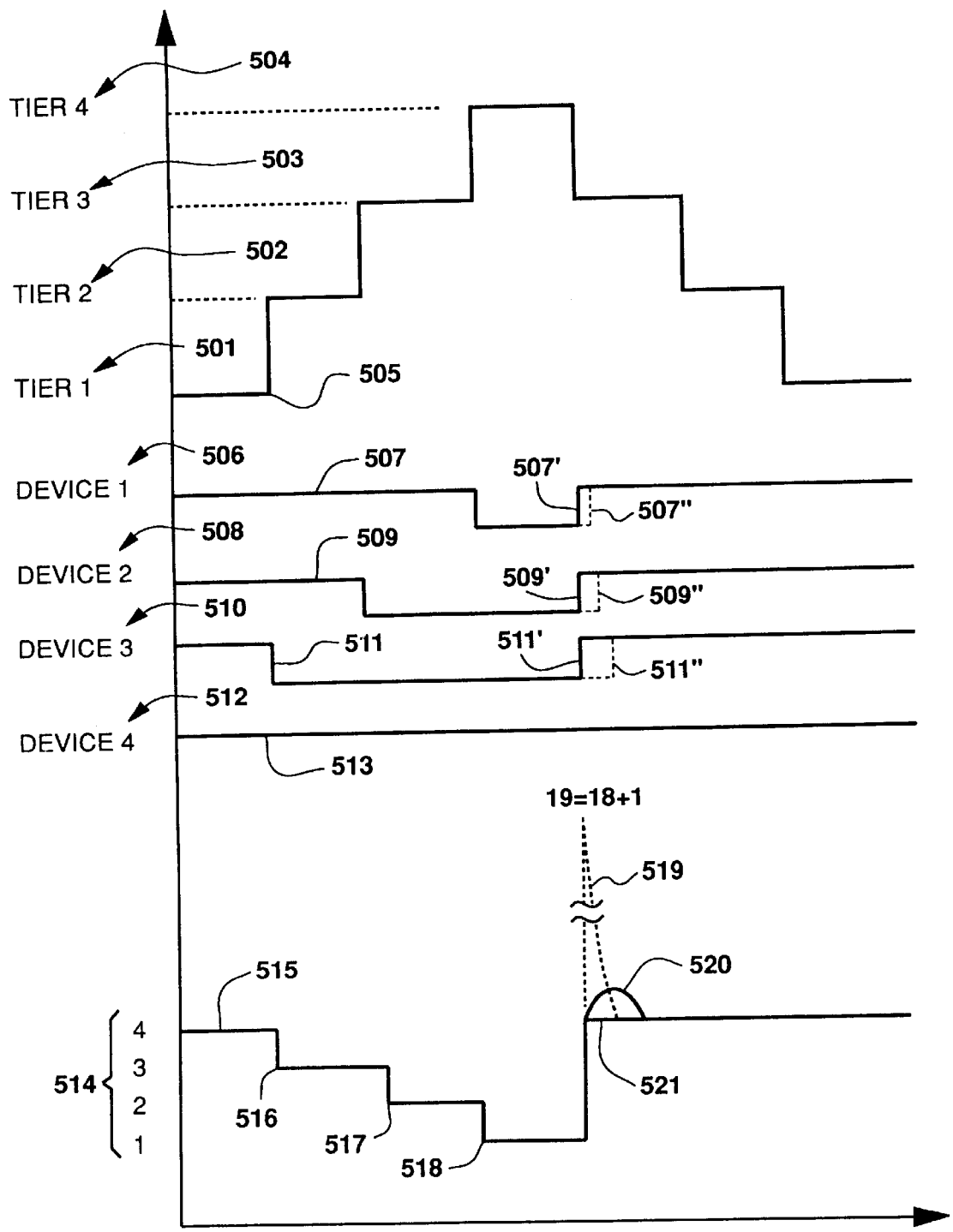
FIG. 5 shows an example of the combination of influx currents on a power grid as contemplated by embodiments of the present invention.

FIG. 5 shows the effect of the application of the present invention to the influx current as drawn by started devices. FIG. 5 shows, for example, four pricing tiers: Tier 1 501 (represented by pricing level 505) Tier 2 502, Tier 3 503, and Tier 4 504. It is readily understood that additional or fewer tiers may be used in accordance with the scope of the present invention. FIG. 5 shows the arrangements of pricing tiers during the course of a day. These tiers may relate to, for example, the costs of energy usage during the summer months. The tiers, in this example, may be associated with the following interpretations:

Tier 1 Normal Load on Power Grid;
Tier 2 Medium Load on Power Grid;
Tier 3 High Load on Power Grid; and,
Tier 4 Critical Load on Power Grid.

These different levels are associated with different prices to encourage the lower usage of power during the higher usage times.

To accommodate the different tiers, customers (through the use of adapted devices) may program their end use devices with their preferred usage schedules. These usage schedules balance the needs of the customer with the customer's reluctance to pay for the energy consumed at higher pricing tiers. Also, the schedule used for various end use devices may be different.

For example, in a customer's house with a thermostat and a pool pump, the customer has programmed each with a different operating schedule. As to the pool pump, the consumer has programmed it to run in all but the most costly pricing tier. As to the thermostat, the consumer has programmed it to keep the consumer's house at 75 degrees Fahrenheit with the following temperature additions:

add 0 degrees in tier 1,
add 2 degrees in tier 2,
add 5 degrees in tier 3, and
add 8 degrees in tier 4.

These programmed temperature additions reduce HVAC operation during the more costly pricing tiers and increase it during the less expensive pricing tiers. In particular, the consumer has opted to allow the gateway (40*a*, 40*b*, or 40*c*, depending on the WAN connected to the consumer) to control the operation of the consumer's thermostat and pool pump in accordance with the changes in pricing tiers. These devices, as well as other devices controlled by a schedule, also allow for the consumer's override of the preset schedule.

In both these devices, the influx in current peaks just after the electric motor in each is turned on. An example of the influx currents as related to changes in pricing tiers is shown in FIG. 5. The operation of device 1 506 is represented by line 507 (device 1 operates in all but tier 4). The operation of device 2 508 is represented by line 509 (device 2 operates in all but tiers 3 and 4). The operation of device 3 510 is represented by line 511 (device 3 operates in all but tiers 2–4). Finally, the operation of device 4 512 is represented by line 513 (device 4 operates during all tiers).

Reference elements 514 show the unit levels of current drawn by all devices. When all four devices 506, 508, 510, and 512 are operating, the current drawn is shown by level 515. When only three devices (506, 508, and 512) are operating, the current drawn is shown by level 516. When only two devices (506 and 512) are operating, the current drawn is shown by level 517. Finally, when only one device (512) is operating, the current drawn is shown by level 518. These current levels reflect the operation schedules of each of the devices 506, 508, 510, and 512.

As shown by schedules, 507, 509, and 511, devices are all scheduled to turn on at the same time when pricing tier 4 drops to pricing tier 3. These turn on points are shown by level shifts 507', 509' and 511'. As each electric motor draws up to six times its normal operating current, the combined current draw may be up to eighteen times the normal current draw for the combination. Here, this high current draw is indicated by spike 519. The peak of spike 519, in this example, may be up to 18 times the normal current draw for any signal device 506, 508, 510, or 512. The value 19 with three devices turning on is the sum of each current spike of devices 506, 508, and S10 plus the operating current (value of 1) of device 512.

As indicated above, the high current draw may result in the repeated tripping of reclosures in the power grid. As each reclosure trips, the devices creating the influx of current may not receive enough power to start up. Accordingly, each reclosure may be repeatedly asked for the same high amount of current to the point the reclosure locks itself open.

According to embodiments of the present invention, the turn-on time of each device is offset so as to shift the current draw for each device to minimize the current flux over time. In this example, a random time shift is added to the start time of each device. In this example, device 506 has a small offset, device 508 has a larger offset, and device 510 has an even larger offset. These offsets are shown by the distance between the level shifts 507', 509', and 511' and 507", 509" and 511", respectively. As the influx for each device is separated by random offsets, the current spike 519 does not appear. Rather, the increase in current drawn by the combination of devices is shown by sloping curve 520.

The random offsets may be generated by a number of different ways. Embodiments of the present invention contemplate a random number being generated in a micro controller. The random number is then multiplied by a time constant to derive a random offset. For instance, the random number is generated between 0 and 1. This value is then multiplied by a time constant of 10 minutes. Thus, the resulting time offset is a time value of between 0 and 10 minutes. The random number may be generated by a random number generator or a pseudo-random number generator with a starting seed.

Also, the location of the random number generator may vary per application. For example, a random number generator may be used in each device. Embodiments of the present invention contemplate the random number being generated in each device so that each device in a consumer's home may be subject to a different offset and lessen each consumers current influx spike. Additionally, embodiments of the present invention contemplate the random number being generated in at least one of the LAN cards 415, 420, or 425 (for example, in a Motorola micro controller HC11) in gateways 40*a*, 40*b*, and 40*c* so as to minimize the processing required in each end use device. By generating a common random offset for each consumer at gateways 40*a*, 40*b*, and 40*c*, the consumer's sensitivity to different end use devices starting at different times may be lessened. For example, by starting the HVAC unit and the pool pump at the same random offset may go unnoticed by a consumer. Otherwise, the consumer may question why both devices start at different times, while both are scheduled to start at the same time.

FIG. 6 shows a flowchart of the operation of the randomization of offset times according to embodiments of the present invention. At step 601, the gateway or end use device receives notification of a change in a pricing tier.

At step 602, it is determined whether the change was received before the end of a reset interval. The reset interval is a settable value of time. When the reset interval has lapsed without any change in the pricing tier, the random number used by the method is regenerated. For example, the reset interval can be set at six hours. This setting indicates that if no pricing tier change is received after six hours, then regenerate the random number. As a six hour delay before receiving a change in the pricing tier would most likely happen at night, one can use a value (such as six) to have the method reset each night.

Step 603 is implemented if no change in pricing tier was received before the end of the reset interval. Step 604 initializes the reset interval when either a pricing tier change was received or when the random offset is regenerated.

Step 605 sets a variable of a summed time (SUMMED TIME) to equal the random offset plus a time in which the pricing tier is supposed to change. The pricing tier information is transmitted to the gateway in at least one of two ways depending on the WAN used. In a broadband WAN, when each change in pricing tier is received, a time associated with the change (for example, "Change to Price Tier 4 at 12:00 PM") is recorded. In a narrow band WAN, a schedule of pricing tier changes is transmitted (for example, "Change to Price Tier 3 at 11:00 AM, Change to Price Tier 4 at 12:00 PM, Change to Price Tier 3 at 2:00 PM . . . "). The schedule is stored and the time associated with the next tier change is recorded.

Step 606 indicates that the summed time (SUMMED TIME) is stored in a register.

Step 607 indicates that the summed time (SUMMED TIME) is compared with the current time to see if they match. If the current time matches SUMMED TIME, meaning that the tier change occurs now, step 608 is implemented which changes the value of the stored tier. This value of the stored tier may be stored in the same register which stores the SUMMED TIME. Then, the method proceeds to step 609. Also, if the comparison of step 607 results in a different time, step 609 is implemented.

Step 609 operates the end use device in accordance with the stored tier currently in effect with a preferred usage schedule. An example of the preferred usage schedule of a thermostat is as follows.

| Time | Requested Action |
| --- | --- |
| 8:00 AM | Set Temperature to 80 Degrees |
| 5:00 PM | Set Temperature to 75 Degrees |

The preferred usage schedule is subject to the tier changes as follows:
add 0 degrees in tier 1,
add 2 degrees in tier 2,
add 5 degrees in tier 3, and
add 8 degrees in tier 4.

Accordingly, as the tiers change, the temperature to be maintained at the location of the thermostat varies as well. While this example is given with respect to a thermostat, the preferred usage schedule is readily applied to other end use devices as well.

Step 610 detects if there was a change in the pricing tier. If no change was received, then the method loops back to step 607. If a change in price tier was received, then the method steps back to step 601.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A control system for changing the operation of an end use device based on a random time offset comprising:
    a headend for creating a data message including information about the random time offset and routing the data message;
    a wide area network coupled to said headend, wherein said headend routs the data message to said wide area network, said wide area network receiving the data message and transmitting the data message;
    a gateway for receiving the data message from said wide area network, said gateway including
        a wide area network interface, coupled to said wide area network, for recovering the data message and transmitting the data message; and,
        a local area network interface, coupled to said wide area network interface, for receiving the data message and transmitting the data message;
    a local area network, coupled to said local area network interface, for delivering the data message; and
    an end use device, coupled to said local area network, for receiving the data message from said local area network interface over said local area network and changing the operation of said end use device in response to said random time offset.

2. The control system according to claim 1, wherein said wide area network is selected from the group consisting of coaxial, fiber, hybrid fiber coaxial, broadband, RF, telephony, hybrid RF/telephony, and satellite.

3. The control system according to claim 1, wherein said local area network interface is selected from the group consisting of a power line carrier communications interface, a hardwired interface, an RF interface, a broadband modem, and an RS-232 interface.

4. The control system according to claim 1, wherein said wide area network interface in said gateway is interchangeable for a different wide area network interface to be compatible with a different wide area network.

5. The control system according to claim 1, wherein the random time offset is generated in said gateway and transmitted to said end use device through said local area network.

6. The control system according to claim 1, wherein the random time offset is generated in said end use device.

7. The control system according to claim 1, wherein the data message represents a change in pricing tier of energy usage rates.

8. The control system according to claim 1, wherein the data message represents a schedule of pricing tiers of energy usage rates.

9. The control system according to claim 8, wherein the operation of the end use device is controlled by the comparison of a current time and the schedule of pricing tiers as altered by said random time offset.

10. The control system according to claim 1, wherein the operation of the end use device is controlled by the combination of a preferred usage schedule as altered by said random time offset and said current time.

11. The control system according to claim 1, wherein said random time offset is calculated from a pseudo-random number.

12. A method for controlling the power consuming operation of an end use device comprising the steps of:

receiving a change in a rate tier;

receiving a time associated with said change in the rate tier;

altering the time associated with said change by a first random time offset;

controlling the operation of said end use device based on a comparison of said altered time and a current time.

13. The method according to claim 12, further comprising the step of receiving said change in a rate tier in the form of a single change in a rate tier.

14. The method according to claim 12, further comprising the step of receiving said change in a rate tier in the form of a schedule of changes.

15. The method according to claim 12, further including the steps of:

determining whether said change in said rate tier occurred before an end of a rate tier hold interval;

based on said determining step, generating second random time offset to replace said first random time offset.

16. The method according to claim 12, further comprising the step of storing said altered time in a register, and wherein said controlling step reads said altered time from said register.

17. The method according to claim 16, wherein said controlling step changes a current tier value when said altered time and a current time match, and said controlling step additionally uses said current tier value in combination with a preferred usage schedule to control the operation of said end use device.

* * * * *